United States Patent
Cohn et al.

(10) Patent No.: US 7,234,074 B2
(45) Date of Patent: Jun. 19, 2007

(54) MULTIPLE DISK DATA STORAGE SYSTEM FOR REDUCING POWER CONSUMPTION

(75) Inventors: David Leslie Cohn, Dobbs Ferry, NY (US); Michael David Kistler, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 10/738,712

(22) Filed: Dec. 17, 2003

(65) Prior Publication Data

US 2005/0138284 A1     Jun. 23, 2005

(51) Int. Cl.
  *G06F 11/00* (2006.01)
(52) U.S. Cl. .......................................... 714/6; 713/324
(58) Field of Classification Search .................. 714/6, 714/701; 713/324; 711/114
  See application file for complete search history.

(56) References Cited

U.S. PATENT DOCUMENTS

| | | | | |
|---|---|---|---|---|
| 5,392,244 A | * | 2/1995 | Jacobson et al. | 711/114 |
| 6,961,815 B2 | * | 11/2005 | Kistler et al. | 711/114 |
| 7,035,972 B2 | * | 4/2006 | Guha et al. | 711/114 |
| 7,076,606 B2 | * | 7/2006 | Orsley | 711/114 |
| 2002/0059539 A1 | * | 5/2002 | Anderson | 714/6 |
| 2005/0228949 A1 | * | 10/2005 | Yamamoto et al. | 711/114 |
| 2005/0273638 A1 | * | 12/2005 | Kaiju et al. | 713/323 |

OTHER PUBLICATIONS

Gibson, G., et al., Failure Correction Techniques for Large Disk Arrays, Proceedings of the Third International Conference on Architectural Support for Programming Languages and Operating Systems, Apr. 1989, pp. 123-143, Boston, MA.

* cited by examiner

*Primary Examiner*—Marc Duncan
(74) *Attorney, Agent, or Firm*—Casimer K. Salys; Dillon & Yudell LLP

(57) ABSTRACT

A data storage system in which each of a set of disks has a first portion for either popular data or error correction information (parity or Reed-Solomon code symbols) associated with the popular data, and a second portion used for other data. A disk controller connected to the set of disks maintains a first popular data block in the first portion of a first of the set of disks and a second popular data block in the first portion of a second of the set of disks. The system maintains at least two of the disks in an active state. The active disks are selected to insure that any data in the popular data blocks can be determined from data stored in the active disks. An additional disk is maintained in an active state if write access is permitted or if there is an additional popular data block.

17 Claims, 6 Drawing Sheets

| FILE 171 | SIZE 172 | S/R 173 | DISK 174 | LOC 175 | MOD 176 | FREQ 177 | PRI 178 | REGION 179 |
|---|---|---|---|---|---|---|---|---|
|  |  |  |  |  |  |  |  |  |
| ABC | 200 K | S | 1,2,3,4,5 | T5, S8 | N | 12:02 | 5 | 1 |
| XYZ | 180 K | R | 2 | T7, S1 | Y | 11:34 | 1 | 3 |
|  |  |  |  |  |  |  |  |  |
|  |  |  |  |  |  |  |  |  |
|  |  |  |  |  |  |  |  |  |

FIG 7

| DISK | STATUS 181 | CAPACITY 182 | DATA ALLOC 183 | | PARITY ALLOC 186 | |
|---|---|---|---|---|---|---|
|  |  |  | TOTAL 184 | FREE 185 | TOTAL 187 | FREE 188 |
| 1 | ACTIVE | 100 |  |  |  |  |
| 2 | ACTIVE | 100 |  |  |  |  |
| 3 | INACTIVE | 100 |  |  |  |  |
| 4 | INACTIVE | 100 |  |  |  |  |
| 5 | INACTIVE | 100 |  |  |  |  |

FIG 8

| DISK 1 | DISK 2 | DISK 3 | DISK 4 | DISK 5 |
|---|---|---|---|---|
|  |  |  |  |  |

FIG 9

MULTIPLE DISK DATA STORAGE SYSTEM FOR REDUCING POWER CONSUMPTION

BACKGROUND

1. Field of the Present Invention

The present invention generally relates to the field of data storage systems and more particularly to data storage systems that implement redundant disk arrays.

2. History of Related Art

In the field of data storage, redundant disk arrays are well known. Perhaps the most widely known implementations of disk arrays are referred to as RAID, an acronym for redundant array of independent (or inexpensive) disks. In a RAID system, multiple disks are used to store data more reliably than data can be stored on a single disk. In a single disk system, a disk crash results in the loss of any data that has not been saved to an external storage medium such as a tape. In RAID systems, the use of multiple disks improves reliability by enabling data redundancy. In the context of RAID systems, the term redundancy refers to the system's immunity to disk crashes. More specifically, RAID redundancy enables the system to recover all data following the crash of any single disk within the system.

The varieties of RAID redundancy are the subject of extensive literature. In a RAID 1 system, redundancy is achieved by "mirroring", which is simply storing a copy of all data on two disks. Although this type of redundancy is relatively expensive in terms of data storage (because at least 50% of storage capacity is used for redundancy), RAID 1 systems are simple to implement and have performance advantages over other RAID schemes. In a RAID 4 system, data is "striped" across multiple drives to improve performance (by enabling simultaneous access to different sections of a file) while redundancy is achieved by storing parity information on a single drive (the parity drive). In a RAID 5 system, data is typically striped across multiple disks in a RAID 4 fashion, but the parity information is distributed across multiple disks such that a portion is stored on a first disk, a portion on a second disk, and so forth. RAID 5 systems allow simultaneous access to different regions of parity information, which can further improve performance.

Historically, the primary considerations given to the design of RAID systems were performance and storage cost. Performance, in turn, was typically optimized by maintaining all disks in an active state to minimize access delays. More recently, an increasingly important consideration in the design of RAID systems is operating cost or energy consumption.

Disk drives contain both mechanical and electronic components that consume energy. The mechanical components rotate the drive platters under the read/write heads and position the heads over a specific track of the platter. The electronic components accept commands from a device bus and process the commands by directing the operation of the mechanical components as necessary.

In current technology disk drives, the majority of the drive's energy consumption is attributable to the drive's mechanical components and, in particular, to the rotational motor responsible for spinning the platters. Consequently, power management techniques for disk drives typically attempt to conserve energy by turning off the rotational motor(s) during periods when the drive is not processing commands. Unfortunately, the performance cost of turning off the drive motors, measured in terms of the time required to return the drive to the active state in which data can be read or written from the disk, is significant (typically 2 to 5 seconds). Thus, in an implementation that aggressively spins down disks to conserve power consumption, performance degradation is a significant issue.

Accordingly, it would be desirable to implement a data storage system and methodology that addressed the issues of energy consumption and performance in a redundant disk array.

SUMMARY OF THE INVENTION

The identified objective is addressed by a data storage system in which each of a set of disks has a first portion for either popular data or error correction information associated with the popular data, and a second or remaining portion used for other data. A disk controller connected to the set of disks maintains a first popular data block in the first portion of a first of the set of disks and a second popular data block in the first portion of a second of the set of disks. The system maintains at least two of the disks in an active state. The active disks are selected to insure that any data in the popular data blocks can be determined from data stored in the active disks. In one embodiment, the error correction information is encoded using Reed-Solomon encoding based on the data in the first and second popular data blocks. The disk controller may maintain additional popular data blocks, with each popular data blocked being maintained in the first portion of a corresponding disk. In this embodiment, the system may maintain additional disks in an active state. Preferably the number of active disks just equals the number of popular data blocks although the active disks and the disks containing the popular data blocks may not be the same. If the popular data is capable of being written to (i.e., is not read only data) an additional active disk is maintained.

BRIEF DESCRIPTION OF THE DRAWINGS

Other objects and advantages of the invention will become apparent upon reading the following detailed description and upon reference to the accompanying drawings in which:

FIG. 7 and FIG. 8 illustrate exemplary data storage tables employed in one embodiment of the invention;

FIG. 9 illustrates an exemplary register for tracking coherency;

Figure 1:
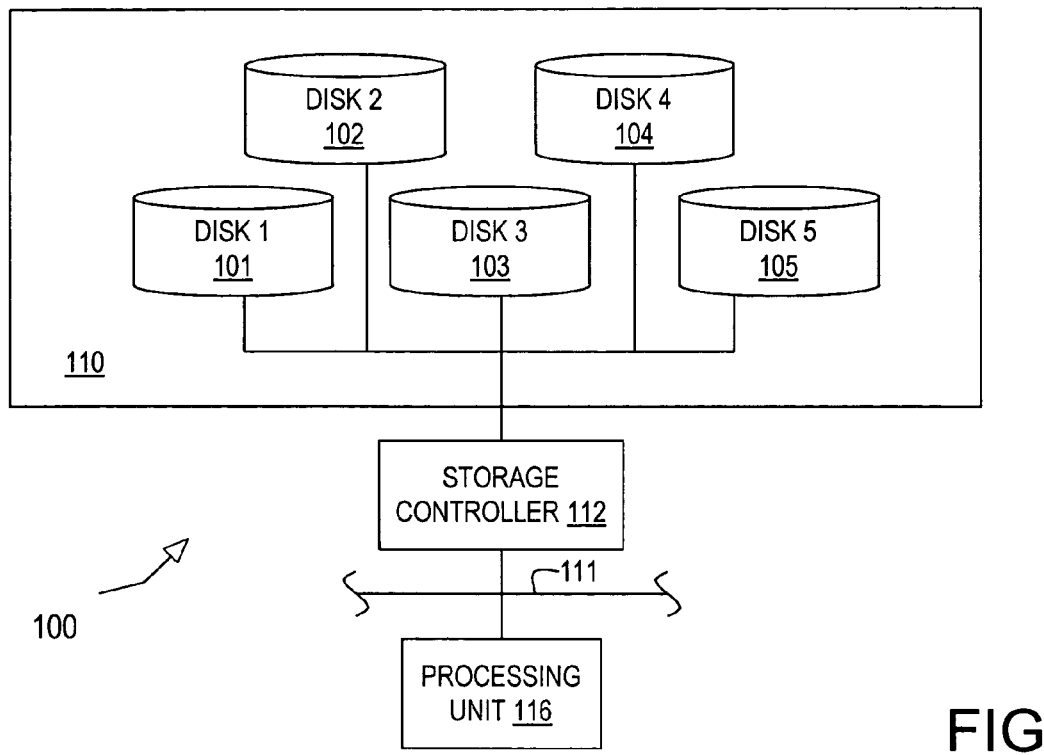
FIG. 1 is a block diagram of selected elements of a data storage system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but to the contrary, the intention is to cover all modifications, equivalents, and alternatives falling within the spirit and scope of the present invention as defined by the appended claims.

DETAILED DESCRIPTION OF THE INVENTION

The present invention contemplates a system and method for reducing energy consumption in server-class or other multiple-disk storage systems.

Turning now to the drawings, FIG. 1 illustrates selected components of a data processing system 100 and its corresponding multiple-disk data storage system according to one embodiment of the invention. In the depicted embodiment, system 100 includes one or more processing units 116 (one of which is shown) coupled to a storage controller 112 through an interconnect 111. Processing unit 116 may be implemented with any of a wide variety of data processing systems typified by a microprocessor based computing system such as a network server, network computer, workstation, desktop computer, and the like. The interconnect 111 may be implemented with wire cabling such as in a conventional Ethernet or token ring network, optical fiber, or with wireless technology.

Storage controller 112 includes elements of a conventional RAID controller and is suitable for managing the storage of data on the array of disks 110. Accesses (reads and writes) of data to array 110 initiated by any processing unit 116 are handled by controller 112. Thus, controller 112 determines, for example, the manner in which data redundancy and data striping are achieved. Storage controller 112 preferably maintains one or more data tables, described in more detail below, that facilitate the allocation of storage and the redundancy implementation. Storage controller 112 also controls the mechanical state of each of the disks 101 through 105 of disk array 110. It will be appreciated that, although the depicted embodiment employs a disk array having five disks, the precise number of disks in disk array 110 is an implementation specific detail that does not substantially alter novel components of disk controller 112.

Storage controller 112 is preferably configured to implement a hybrid of conventional RAID redundancy schemes to achieve high performance (low access latency) while simultaneously minimizing energy consumption. In one embodiment, storage unit 112 is configured to determine a storage priority for each file (or other portion of data). The storage priority, as used in this context, is indicative of a file's suitability for replication and is determined by the file's popularity and stability. Replication of data is best reserved for data that is accessed frequently. Thus, a file or data that is accessed frequently is assigned a high storage priority, while data that is rarely accessed is assigned a low storage priority. Rarely accessed data is not a replication candidate because the amount of storage required to replicate the data is not cost justified in terms of the frequency with which the data is accessed. In other words, some data is accessed so rarely that any disk spinning required to access the data is cheaper than replication the data on multiple disks.

Storage controller 112 uses the storage priority to determine the storage organization to be used for the corresponding data. Data having the highest storage priority may be replicated on every disk 101 through 105 of disk array 110 while data having a lowest storage priority may be stored on only a single drive and protected from disk failures using parity. Typically, all data in disk array 110 will be stored in an organization that provides protection against data loss in the event of a disk crash. Thus, even data having the lowest storage priority would typically be stored with RAID parity such as in a RAID 4 or RAID 5 system (i.e., with the corresponding parity information being stored on a single disk or distributed across multiple disks).

Storage controller 112 may implement various levels of complexity in determining storage priorities. At one extreme, a "binary" storage priority is used to determine whether data is replicated on multiple disks or not replicated but protected with parity. In such a binary priority implementation, data having a first storage priority is stored on every disk 101 through 105 of disk array 110 while data having a second storage priority is stored on a single disk (or possibly striped across multiple disks) and protected from disk failures using parity.

Figure 2:
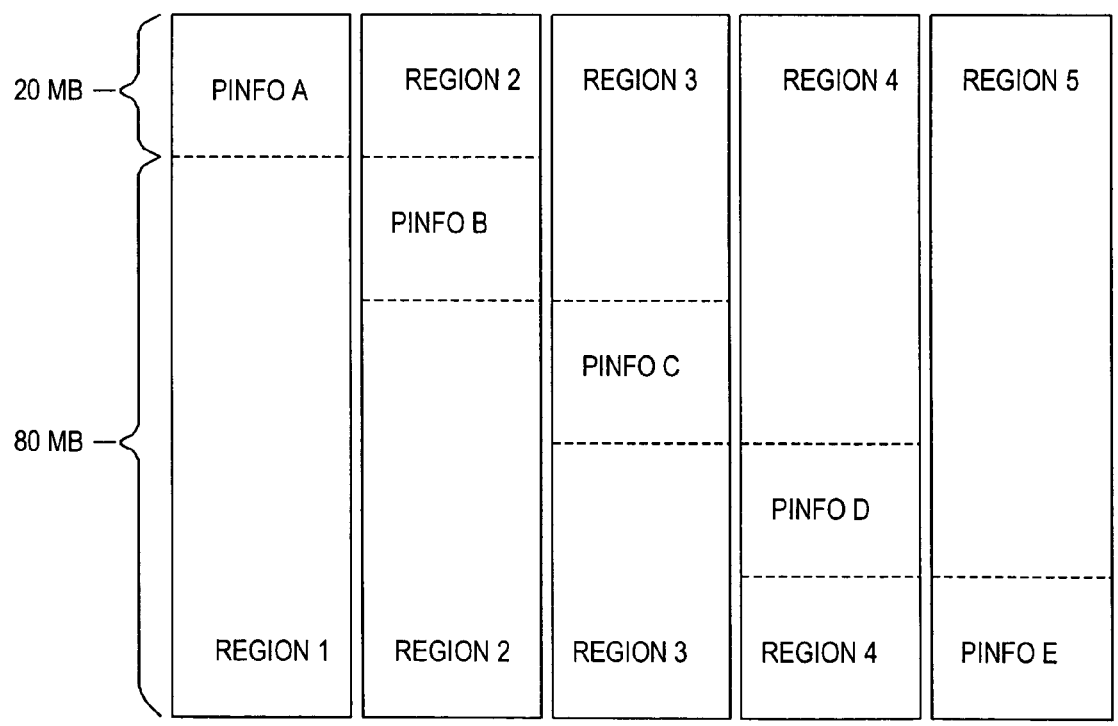
FIG. 2 is a conceptual representation of data storage allocation according to the prior art.

Referring now to FIG. 2, a conceptual depiction of the manner in which data is stored by a conventional RAID controller across disks in a disk array is depicted to provide a point of reference for the subsequent description of the invention. The depicted implementation illustrates a RAID 5 storage scheme. In RAID 5, parity information is distributed across all of the disks in the disk array, typically in a stair-step fashion as shown. In this conceptualization, the data on each disk is identified as a single data region. Thus, for example, data region 2 represents all of the data storage on disk 2, data region 3 represents all of the data storage on disk 3, and so forth.

A characteristic of RAID parity is that, in a disk array having N equi-sized disks, 1/N of the total storage capacity is dedicated to storing parity information. This parity information typically takes the form of the Exclusive OR (EXOR) product of the data having the same address on the remaining disks. (RAID parity information stands in contrast to ECC, checksum, or other error correction techniques in which the data itself includes error correction information that indicates whether the corresponding data is correct). Thus, in the depicted embodiment having five disks, 20% of the total capacity is needed for parity information. Data is stored on the remaining 80% of the capacity such that any particular piece of data is stored on just a single disk.

The depicted embodiment illustrates a set of five disks, each having a capacity of 100 MB, for a total capacity of 500 MB. Of this capacity ⅕ of each disk (20 MB) is needed for parity information and 80 MB is available for data. Thus, 400 MB of data storage is available. While this represents a desirable ratio of available storage to total disk array capacity, it will be appreciated that, reducing energy consumption in a conventional RAID 5 implemented disk array would typically cause a significant performance penalty. More specifically, assuming that accesses to disk are more or less randomly distributed across drives, each disk is accessed by roughly 20% of the total disk array accesses. If an energy conservation policy is employed in which disks are aggressively powered down (spun down) when not in use, one can appreciate that a considerable percentage of disk accesses will be made to disks that are in a powered down state thereby causing substantial performance penalties as powered down disks are turned on. In a conventional RAID 4 format (not depicted) where the parity information is concentrated in a single disk drive, a similar dilemma is presented when trying to aggressively spin down disks.

To address the power-consumption/performance tradeoff forced by conventional RAID implementations, the present invention contemplates storage schemes that may employ multiple RAID techniques on a single disk array in conjunction with disk access pattern data and analysis for replicating selected data on multiple disks while storing other data on a single disk but still protected from failures by parity information. In addition, the invention pursues an aggressive energy conservation policy by maintaining one or more disks in a low power state. The Advanced Technology Attachment (ATA) specification identifies four power states employed by compliant disk drives. The Active state represents normal drive operation. In the Idle state, the disk electronics power down but still receives commands. In the Standby state, the drive spins down and the electronics power down. In the Sleep state, everything is powered down, and the electronics will not respond except for a power reset. Similar power states are specified for Small Computer System Interface (SCSI) disks. A disk in Idle, Standby, or Sleep state must return to Active state before data may be read from or written to the disk. Any access to a disk in Idle, Standby, or Sleep state must wait for the disk to return to Active state before the access can be performed. This delay can be on the order of several seconds for certain power states, and can result in significant performance degradation for the application performing the access. In the remainder of this document, the Idle, Standby, and Sleep states will be referred to as "inactive" states and the term "spin up" will refer to a transition from any of the inactive states to an active state and "spin down" will refer to any transition from an active state to an inactive state.

Figure 3:
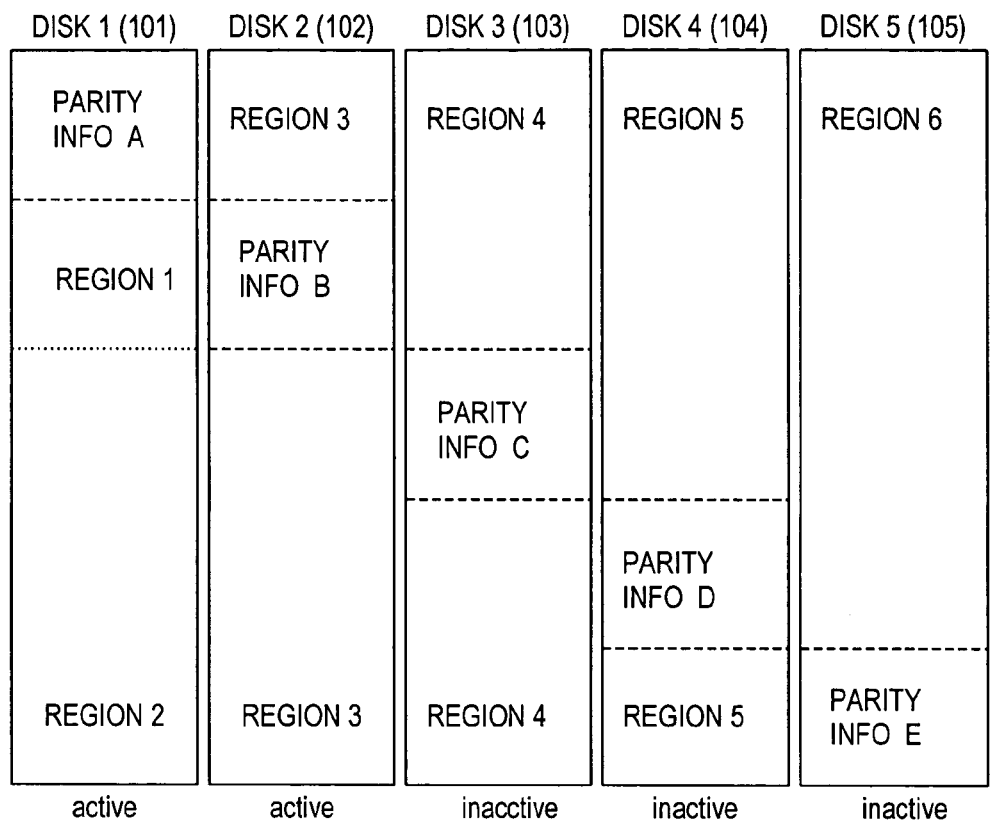
FIG. 3 is a conceptual representation of data storage allocation on the data storage system of FIG. 1 according to one embodiment of the invention.
Figure 5:
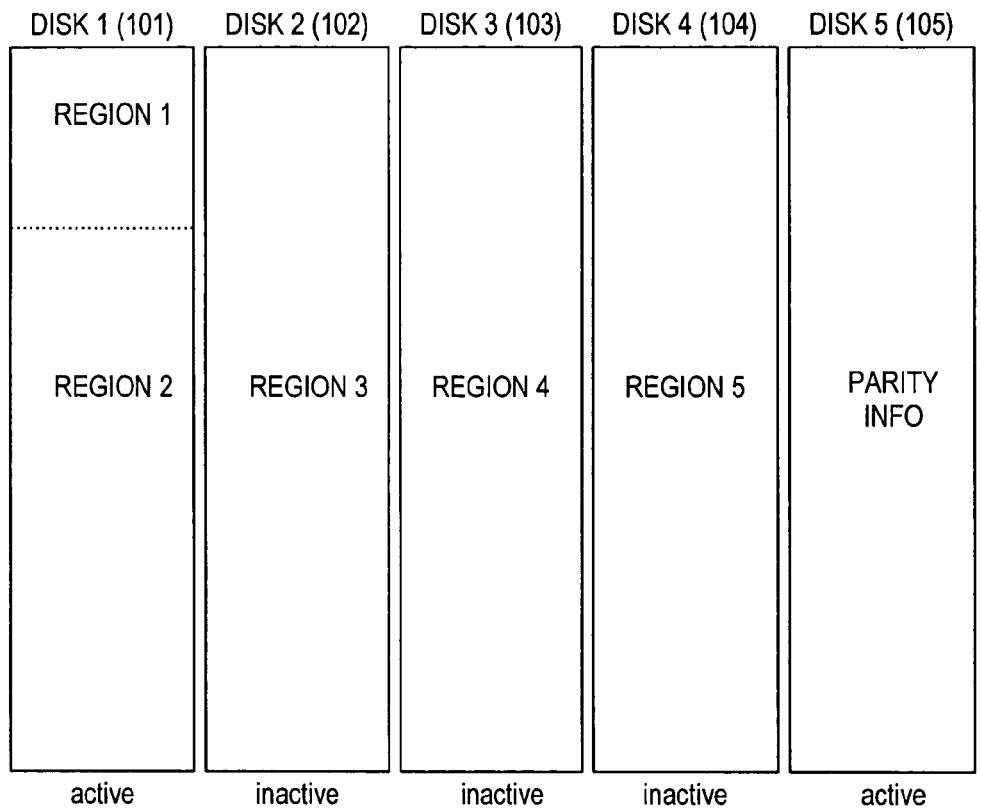
FIG. 5 is a conceptual representation of data storage allocation on the data storage system of FIG. 1 according to one embodiment of the invention.

Referring to FIG. 3 and FIG. 5, conceptual illustrations of disks 101 through 105 are presented to illustrate storage methodologies employed by one embodiment of storage controller 112 and system 100. In each of these embodiments, each piece of data is stored on just a single disk (i.e., not replicated), but disk access patterns are analyzed to determine the popularity for each file or other portion of data. The storage popularity is indicative of the corresponding data's frequency of access and frequency of modification. Data that is accessed frequently, but rarely modified, is assigned a high popularity, while data that is rarely accessed or frequently modified is assigned a low storage popularity. The popularity of data is used to place or migrate the storage of popular data to a single disk while less popular data is distributed across one or more of the remaining disks. In the depicted embodiments, popular data is represented by the region of storage identified as REGION 1, and all other regions represent storage of less popular data. In the absence of data replication, parity is maintained in a RAID 5 (FIG. 3) or RAID 4 (FIG. 5) manner.

In the depicted embodiments, popular data identified as REGION 1 is illustrated as residing on DISK 1 (101). In FIG. 3 and FIG. 5, disk 101 is shown as including a second region (REGION 2). In some embodiments, REGION 2 may be eliminated such that all of the data storage of disk 101 is allocated to REGION 1. In other embodiments, storage controller 112 may limit the size of REGION 1 to ensure that the data maintained in REGION 1 is accessible with the lowest latency.

The embodiments depicted in FIG. 3 and FIG. 5 represent a desirable improvement over conventional RAID 4 and RAID 5 configurations for the purpose of energy conservation. It is believed that, in most data collections, a relatively small portion of the data accounts for a relatively large percentage of data accesses. Under a widely circulated, if less than scientific, rule of thumb, roughly 90% of all data accesses target roughly 10% of the data. The data storage structures shown in FIG. 3 and FIG. 5 reflect this rule of thumb by allocating a relatively small portion of data that is accessed frequently to a single disk. Assuming that a relatively large percentage of accesses are confined to data stored in REGION 1, it will be appreciated by those having the benefit of this disclosure that the data organization schemes of FIG. 3 and FIG. 5 are compatible with an energy conservation policy in which one or more disks are powered down a majority of the time.

More specifically, one or more of the disk drives not containing REGION 1 are spun down or otherwise transitioned to a less than full power state (such as the Standby state or the Sleep state). Thus, as depicted in FIG. 3 and FIG. 5, disk 101 is preferably maintained in an active state because it contains the most popular data. In the RAID 4 configuration of FIG. 5, the parity disk 105 is preferably maintained in an active state to allow write accesses to REGION 1 or REGION 2 to update the corresponding parity information and thus protect the newly written data from disk failures. In the RAID 5 configuration of FIG. 3, the parity disk may vary because the parity information is distributed across all disks. If the parity information associated with REGION 1 is confined to a single disk such as disk 102, that disk may be maintained in an active state while disks 103, 104, and 105 are put into a sleep state. If the parity associated with REGION 1 is distributed across two or more disks, the disk designated as the parity disk that is maintained in an active state may be the last disk from which parity information was accessed.

In the embodiments depicted in FIG. 3 and FIG. 5, storage controller 112 preferably maintains the data allocated to REGION 1 dynamically. When an access for data not found in REGION 1 occurs, storage controller 112 may update or modify the storage allocation to place the requested data in REGION 1. This dynamic maintenance of REGION 1 is designed to keep the most requested data on a single disk, so that the remaining disks may be placed in a low power state. Thus, when data from another region (such as REGION 3, 4, or 5) is accessed, storage controller 112 activates the disk containing the requested data and retrieves it. Thereafter, storage controller 112 may update the storage allocation by writing the requested data into the REGION 1 storage area.

To accomplish this updating of REGION 1, storage controller 112 may first determine the size of the requested data and compare it to the storage available in REGION 1. If the requested data is smaller than the amount of available storage in REGION 1, the data may be stored into REGION 1 immediately and the data directory updated to reflect the data's new location. If the requested data is larger than the storage available in REGION 1, storage controller 112 may determine which data currently stored in REGION 1 is to be relocated.

The determination of whether the size of requested data exceeds the available storage on a given disk and the determination of what data, if any, to delete or remove from REGION 1, is preferably facilitated by storage directories or tables such as the tables 170 and 180 depicted in FIG. 7 and FIG. 8 respectively. Storage table 170 includes one or more entries 169. Each entry 169 corresponds to a file or data block maintained by system 100 and storage controller 112.

In the depicted embodiment of table 170, each entry 169 includes file name information 171, file size information 172, sequential/random (S/R) indicator 173, disk information 174, location information 175, modification status information 176, access frequency information 177, storage priority 178, and region location information 179. File name information 171 and file size information 172 identify the data by file name and indicate the size of the associated data.

S/R indicator 173 indicates whether the corresponding entry is for data classified as part of a sequentially accessed file or a randomly accessed file. Disk information 174 indicates the disk or disks on which the data is currently stored. In the depicted illustration, the file "ABC" is popular data that is stored on disks 1, 2, 3, 4, and 5 (as described in greater detail below) while file "XYZ" is located on disk 2 exclusively.

Location information 175 indicates a storage location within the specified disk. In the illustrated example, location information 175 includes a track (T) and sector (S) indicator, which are typical of disk storage systems. Modification status 176 indicates whether the data has been written recently and access frequency information 177 indicates when a data block was last accessed.

The storage priority 178 is indicative of how popular the file is (how frequently the data is accessed) and is used to determine the storage organization needed for a particular file. Region information 179 indicates the data region in which the data is stored. In this embodiment, data regions represent collections of data blocks. Although directory 170 is illustrated as including the data shown for each file, it will be appreciated that additional or less information may be maintained for each file and that the data may be formatted differently than shown. In one embodiment, multiple tables similar to table 170 may be maintained by storage controller 112. As an example, controller 112 may maintain a table 170 for each region of data.

Table 180 provides a macroscopic view of the disks 101 through 105 by indicating for each disk, its status information 181, capacity information 182, data allocation information 183 including the amount of storage allocated for data 184 and the amount of storage free for data allocation 185, and parity allocation information 186 including the amount of storage allocated for parity 187 and the amount of storage free for parity allocation 188.

Using the information in table(s) 170 and 180, controller 112 may dynamically maintain the data contained in REGION 1. If an access to data not contained in REGION 1 is made, controller 112 may move the requested data to REGION 1 using the information in tables 170 and 180 to determine whether any data currently residing in REGION 1 needs to moved elsewhere and, if so, which data should be moved. In one embodiment, the access frequency information 177 of table 170 is used to prioritize the data that may be removed when capacity in REGION 1 is limited. Typically, the data that was least frequently accessed is the first data to be moved elsewhere when new data is added to REGION 1. The size information 172 facilitates the determination of how many data blocks must be removed when new data is added to REGION 1 (and capacity is constrained).

Figure 4:
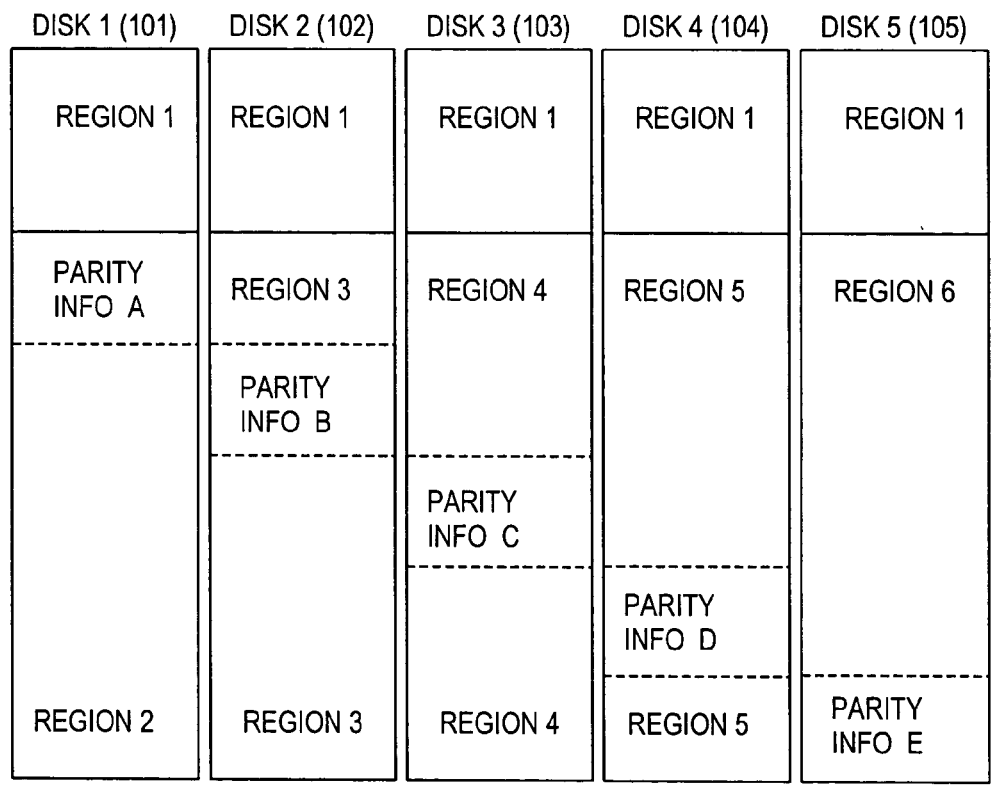
FIG. 4 is a conceptual representation of data storage allocation on the data storage system of FIG. 1 according to one embodiment of the invention.
Figure 6:
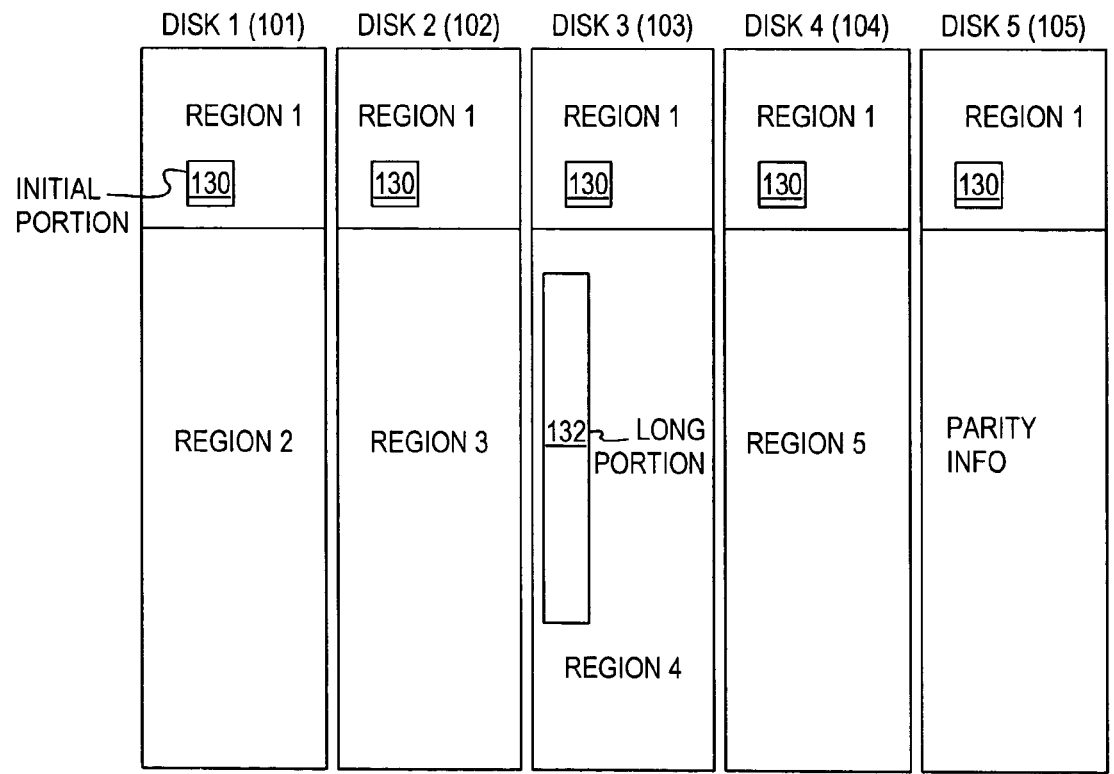
FIG. 6 is a conceptual representation of data storage allocation on the data storage system of FIG. 1 according to one embodiment of the invention.

Turning now to FIGS. 4 and 6, which are conceptual representations of embodiments of the present invention employing hybrid RAID schemes to reduce disk storage power consumption even further than the embodiments depicted in FIG. 3 and FIG. 5. In FIG. 3 and FIG. 5, although popular data is maintained on a single disk, it will be appreciated that accesses to other information will inevitably occur. The examples of the present invention depicted in FIG. 4 and FIG. 6 represent embodiments in which the popular data represented by REGION 1 is replicated on two (as in RAID 1) or more disks 101 through 105 while the remaining data regions are maintained in a traditional RAID 5 (FIG. 4) or RAID 4 (FIG. 6) manner.

By replicating REGION 1 on multiple disks, the embodiments depicted in FIG. 4 and FIG. 6 beneficially require even fewer power transitions of disks 101 through 105 because there is a higher probability that the disk most recently accessed includes the most popular data (REGION 1). In the depicted embodiments, for example, REGION 1 is replicated on every disk 101 through 105. This embodiment guarantees that the most recently accessed disk contains REGION 1.

In other embodiments, the number of disks on which REGION 1 is replicated may vary between 2 and N where N is the total number of disks in system 100 (e.g., five in the depicted examples). Controller 112 may choose the storage organization of data in REGION 1 based on its storage priority, which may be determined by analyzing historical data access patterns to determine the frequency with which the data is accessed. Controller 112 may record the determined storage priority in a table such as table 170 described previously with respect to FIG. 3 and FIG. 5.

Table 170 is preferably also suitable for use in the embodiments depicted in FIG. 4 and FIG. 6 where a hybrid RAID scheme is employed in conjunction with a disk power management policy to conserve disk power consumption. More specifically, table 170 as depicted in FIG. 7 includes the storage priority 178 which is used by controller 112 to determine the storage organization for the data. For data replicated on multiple disks, the storage priority 178 further determines the number of disks on which to replicate the corresponding data. Alternatively, the storage priority 178 may indicate that the data should not be replicated, but instead be protected with parity. By incorporating a storage priority into table 170, the invention contemplates flexible storage organization that can be optimized to accommodate the data access patterns occurring during actual usage of the data.

In an embodiment suitable for ease of implementation, two storage priority levels are used. Data with the first level of storage priority, typically including files that are not accessed frequently, are stored on a single disk and protected from disk failures by parity information stored on a separate disk. Data with the second level of storage priority, typically including frequently accessed files, are replicated on every disk 101 through 105. Embodiments of this type are illustrated in FIG. 4 AND FIG. 6. Although FIG. 4 and FIG. 6 are substantially the same except for the parity implementation for the non-replicated data (FIG. 4 uses RAID 5 parity while FIG. 6 uses RAID 4 parity), the embodiment depicted in FIG. 6 will be discussed in further detail because the RAID 4 implementation is consistent with the present invention's desire to minimize the number of active disks and active disk transitions. Because all parity is stored on a single disk (105 in the illustration) in a RAID 4 configuration, the RAID 4 implementation will generally require fewer disk transitions than a RAID 5, distributed parity scheme.

As depicted in FIG. 6, disks 101 through 105 contain five data regions (Regions 1–5) on disks 101 through 104 and a parity region on disk 105. Each of the disks 101 through 105 includes a copy of the most popular data, represented by REGION 1, that occupies a portion of the disk storage capacity that is typically in the range of 10 to 30 percent. The remainder of the capacity available on each disk 101 through 104 contains data that is not replicated. Thus, disk 101 includes non-replicated data represented by REGION 2, disk 102 includes non-replicated data represented by REGION 3, and so forth. Redundancy is achieved using parity on disk 105 for non-replicated REGIONS 2 through 5. The parity information is typically calculated based upon the data in the remaining disks such that, if any one disk crashes, its data can be regenerated using the surviving disks. In an implementation that will be familiar to those skilled in the design of RAID systems, the parity information on disk 105 is the exclusive or (EXOR) product of the data on disks 101 through 104.

By replicating selected data (REGION 1 data) on multiple disks and using RAID 4 or RAID 5 redundancy on the remaining data, the embodiments of the invention depicted in FIG. 4 and FIG. 6 beneficially trade storage capacity, which is typically relatively cheap and prevalent, for reduced disk drive energy consumption. In the preferred embodiment of FIG. 6, two disks are typically in an active state at any time, namely, one of the disks 101 through 104 as well as the parity disk 105. Because each data disk (disks 101 through 104) contains a copy of REGION 1, a single active data disk is sufficient to handle read accesses to REGION 1. If an access to a non-replicated data region that is not contained on the active disk occurs, disk controller 112 may activate the disk containing the requested non-replicated region and subsequently spin down the previously active data disk. In this manner, it may be possible to maintain only two active disks for a great majority of the operation and to incur an active disk transition (spinning up an inactive disk and spinning down the currently active disk) only when non-replicated data (not on the currently active disk) is accessed.

In one embodiment, the goal of accessing just two (or fewer) disks is furthered by employing a RAID 4 (or RAID 5) design in which "wide" data stripes are preferred to narrow stripes. In conventional RAID 4 and RAID 5 designs, performance is enhanced by striping data across multiple disks. In a striped implementation, a first portion of a file resides on a first disk, a second portion resides on a second disk, and so forth. Performance is improved because different portions of the file may then be accessed simultaneously. To minimize the number of active disks and the number of active disk transitions, however, one embodiment of the present invention employs wider stripes such that large portions of the non-replicated data files reside on a single disk. At its extreme, an entire data file may reside on a single disk such that only that single disk need be active to access the file. This wide striping of non-replicated data, while contrary to conventional RAID designs that are motivated primarily by performance considerations, is consistent with the desire to minimize active disk transitions in the present invention.

Disk controller 112 may employ dynamic mapping of non-replicated data to avoid an active disk transition during write operations. If, for example, disk 101 is the active data disk and a request to write to data currently stored in REGION 3 of disk 102 is received, disk controller 112 may write the data to disk 101, update the storage tables or directories, and mark the old copy of the data in region 3 as invalid or free.

One embodiment of the invention enables improved performance by permitting a portion of a file to reside in REGION 1, which is replicated on multiple disks, while another portion of the file is stored in a non-replicated data region such as REGIONS 2 through 5. This embodiment is particularly beneficial in reducing the latency that occurs when a file, and more particularly a sequential file, residing on a non-active disk is accessed. Sequential files represent files that are accessed sequentially starting from an initial byte and proceeding forward. Software code is typically accessed sequentially. Sequential files are contrasted with randomly accessed files, such as databases, that may be accessed in a random fashion. In the embodiment of table 170 depicted in FIG. 7, data may be characterized as either sequential or random using the S/R indicator 173. It may be desirable in some embodiments to store leading portions of a sequential file as popular data in REGION 1 while storing the rest of the file in non-replicated data. If the file is accessed, the initial portion (which is typically the first portion required when accessing a sequential file) is present in REGION 1. While this portion of the file is being read, the disk on which the remaining portion of the data resides may be activated. Although a disk transition occurs, the performance penalty (latency) is minimized because the initial portion of the file is available and can be accessed in parallel with spinning up the disk containing the rest of the file. This feature of the invention is illustrated in FIG. 6, by the relatively long file 132 in region 4 and its initial portion 130, which is replicated in REGION 1 on disk 101 through 105.

In another embodiment of data storage system 100, the files or data stored in each copy of REGION 1 may temporarily vary from disk to disk depending on the manner in which data is accessed. More specifically, any modifications to the data stored in REGION 1 may be preferentially or selectively performed in the active copy of REGION 1 (the copy of REGION 1 residing on the currently active data disk). If data is written into REGION 1, controller 112 may perform the write operation to just the currently active copy of REGION 1 and indicate that a modification has taken place by setting the appropriate modification indicator 176 (of table 170 in FIG. 7). When an active disk transition occurs, controller 112 may interrogate the modification indicator bits 176 to see if any data has been modified. If data has been modified, controller 112 will copy the contents of the active REGION 1 into the REGION 1 of the newly accessed disk. Thereafter, the storage controller 112 may reset all modification bits 176, change the disk information 174 in table 170, and update status information 181 in table 180 to reflect the currently active disk. An additional table or register 190, depicted in FIG. 9 may be employed in this embodiment to track which disks have the current version of REGION 1. Register 190, in its simplest form, may contain a single bit for each disk 101 through 105. When the active copy of REGION 1 is modified, the corresponding bit in register 190 is set while all other bits are cleared. Upon an active disk transition, when controller 112 copies the previously active REGION 1 to the newly active disk, the register 190 bit corresponding to the newly active disk is set. In this manner, the bits in register 190 that are set indicate the disks that contain a current copy of REGION 1. When an active disk transition occurs, controller 112 can reference register 190 to determine if it is necessary to update REGION 1 on the newly active disk.

Figure 10:
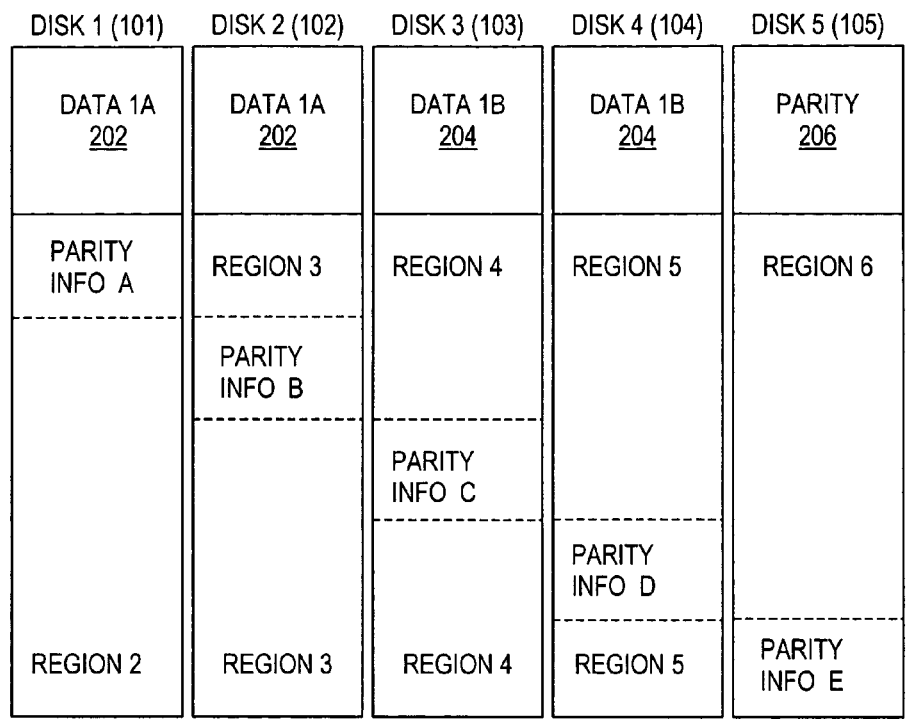
FIG. 10 and FIG. 11 depict an implementation of data storage that uses modified replication of the popular data.

Referring now to FIG. 10, a variation on the use of replication and/or parity in conjunction with frequently accessed data is presented as an improvement to the full replication implementation described above with respect to FIG. 4. In the implementation depicted in FIG. 10, popular data is replicated on less than all of the disks and parity is used. More specifically, FIG. 10 shows an implementation in which a first block of popular data (identified as DATA 1A 202) is replicated on two disks (disks 101 and 102) while a second block of popular data (DATA 1B 204) is replicated on disks 103 and 104. A parity block 206, equal in size to data blocks 1A and 1B is stored on disk 105. The parity information stored in parity block 206 is derived from the DATA 1A blocks 202 and the DATA 1B blocks 204 in a conventional manner (e.g., EXOR sum).

Characteristics of the implementation shown in FIG. 10 include (1) it has twice as much storage for popular data as the full replication implementation shown in FIG. 4 and (2)

any piece of popular data can be read or modified quickly (i.e., without spinning up a disk) as long as disk 5 105 (the parity disk) and at least two other disks are active. If the requirement that the parity drive and at least two drives be active is acceptable, the replication/parity hybrid depicted in FIG. 10 represents an improvement over the FIG. 4 replication because there is less "redundancy overhead" associated with the popular data. As used herein, redundancy overhead refers to the ratio of the disk space used to store redundancy information to the disk space required to store a single copy of the data (i.e., content). In the full replication of FIG. 4, for example, the redundancy overhead of the popular data is 4 because 5 data blocks are used to store 1 block of data content. While the implementation shown in FIG. 4 does guarantee fast read/write access to popular data even when only two disks are active, this benefit comes at the cost of high overhead. Moreover, many applications will frequently require the parity disk and at least two other disks to be active even in a FIG. 4 implementation. In such cases, the ability to power down to only two disks without sacrificing guaranteed fast access to popular data does not provide a substantial benefit.

Under circumstances where the application requires the parity disk and at least two other disks to be active, the implementation depicted in FIG. 10 offers twice as much popular data storage capacity as the FIG. 4 implementation. In addition, the illustrated implementation guarantees fast read or write access to any piece of data in block 1A or 1B as long as the parity disk 105 and at least two other disks are active. If for example, the parity disk 105 and disks 103 and 104 are active, a read access to data in data block 1A is accommodated by accessing the corresponding data in block 1B (disk 104) and the parity disk 105. From this information, the block 1A data can be derived algorithmically. In other words, slow-to-access data (data in block 1A) can be determined from easy-to-access data (data in block 1B and parity disk). It will be appreciated, of course, that the time and power required to derive a data value from another data value and a parity value are orders of magnitude lower than time and power required to access the data from data block 1A on an inactive disk. A write access to a file ABC in data block 1A can be accommodated by writing the new data into a region within data block 1B on disk 103, updating the corresponding parity block on the parity disk 105, and updating table 170 to indicate that data for ABC is now stored on disk 103.

Figure 11:
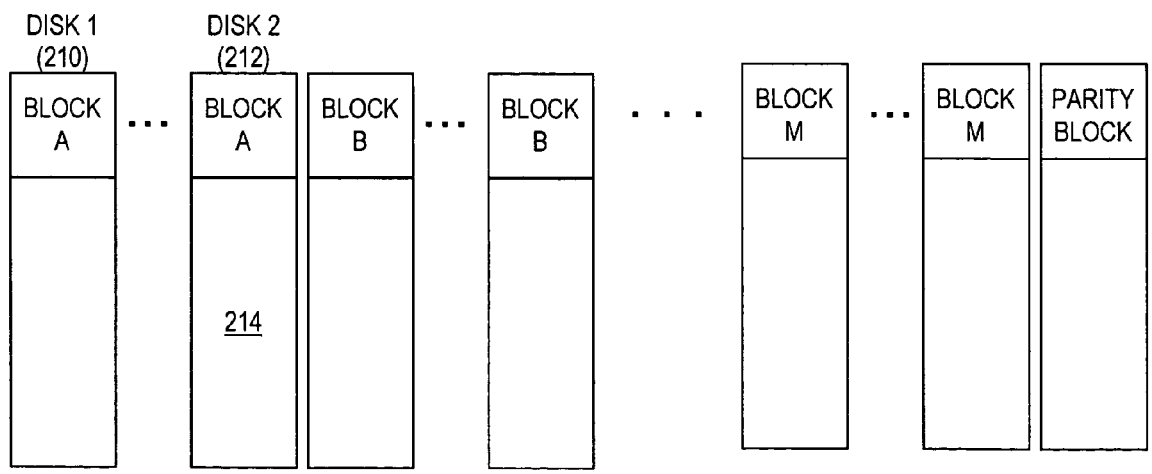

The implementation depicted in FIG. 10 can be generalized to further reduce the redundancy overhead for storage of popular files. In general, as depicted in FIG. 11, K data blocks can be stored on N>K disks by storing one or more copies of each of the K data blocks, each on a separate disk, and one parity block, computed in a conventional manner (e.g., EXOR sum), stored on a parity disk. The redundancy overhead for this storage organization is (N−K)/N. The K data blocks can be replicated to the extent that N exceeds K. If N=13 and K=4, for example, one disk is reserved for popular data parity leaving 12 disks available for storing the 4 popular data blocks. Thus, each of the 4 popular data blocks can be replicated on 3 disks.

In the storage organization depicted in FIG. 11, it may be possible to spin down disks to reduce disk energy consumption. Since popular data is accessed frequently, disks should only be spun down if popular data can be read and/or written without requiring a disk spin up. A read access to a popular data block can be completed without spinning up a disk as long as a disk containing that data block is active or the parity disk and disks containing the remaining K−1 data blocks are all active. A write access to a popular data block can be completed without spinning up a disk as long as the parity disk is active and either the disk containing the requested data block is active or two disks containing a copy of another data block are active. In the latter case, one copy of the other data block is overwritten with the new data for the block being written, the corresponding block on the parity disk is updated, and the corresponding entries of table 170 are updated to indicate the new location of the written data block.

While the data storage implementation of FIG. 10 and FIG. 11 represents an improvement over full replication of popular data, one can appreciate that the constraints on which disks may be active at any time represents a potential performance issue. Specifically, the FIG. 11 implementation places constraints on not just the number of disks that may be active but also the identity of the disks that may be active. While fast access to popular data is guaranteed, access to the non-popular data may be penalized by constraints on which disks are active. Suppose for example, disk 1 210 of FIG. 11 is an actively spinning disk. To minimize the number of active disks while guaranteeing high speed access to popular data as described above, all other disks (such as disk 212) that replicate popular data block A should be inactive. If a request for seldom accessed data in region 214 of disk 212 is made, it will be appreciated that latency increases and performance suffers because disk 212 must be spun up before accessing the requested data. Thus, the replication/parity implementation is not without its limitations.

To overcome the limitation described above, a data storage implementation according to one embodiment of the invention is proposed. In the proposed embodiment, error correction information is spread out over multiple disks in a manner that enables the algorithmic determination of the appropriate data on all disks if the corresponding data on any of a minimum number of disks is known. The technique implies the elimination of the constraint concerning which disks must be active (but does not eliminate the requirement of a minimum number of active disks).

In an embodiment that uses an existing error correction technique, commonly referred to as Reed Solomon (RS), the error correction information is in the form of RS "codes." RS theory says that given a set of "K" pieces of data (symbols), one can generate a set of "M" RS codes, each of which is the same size (number of bits) as each of the K data pieces such that the original K pieces of data can be determined if any K of the K+M symbols are known. The quantity M (the number of RS codes) determines the amount of fault tolerance. Specifically, RS systems can reconstruct the original K pieces of data even if as many as M of the K+M symbols are unavailable. RS codes are typically specified as RS(N,K) where N=M+K.

Figure 12:
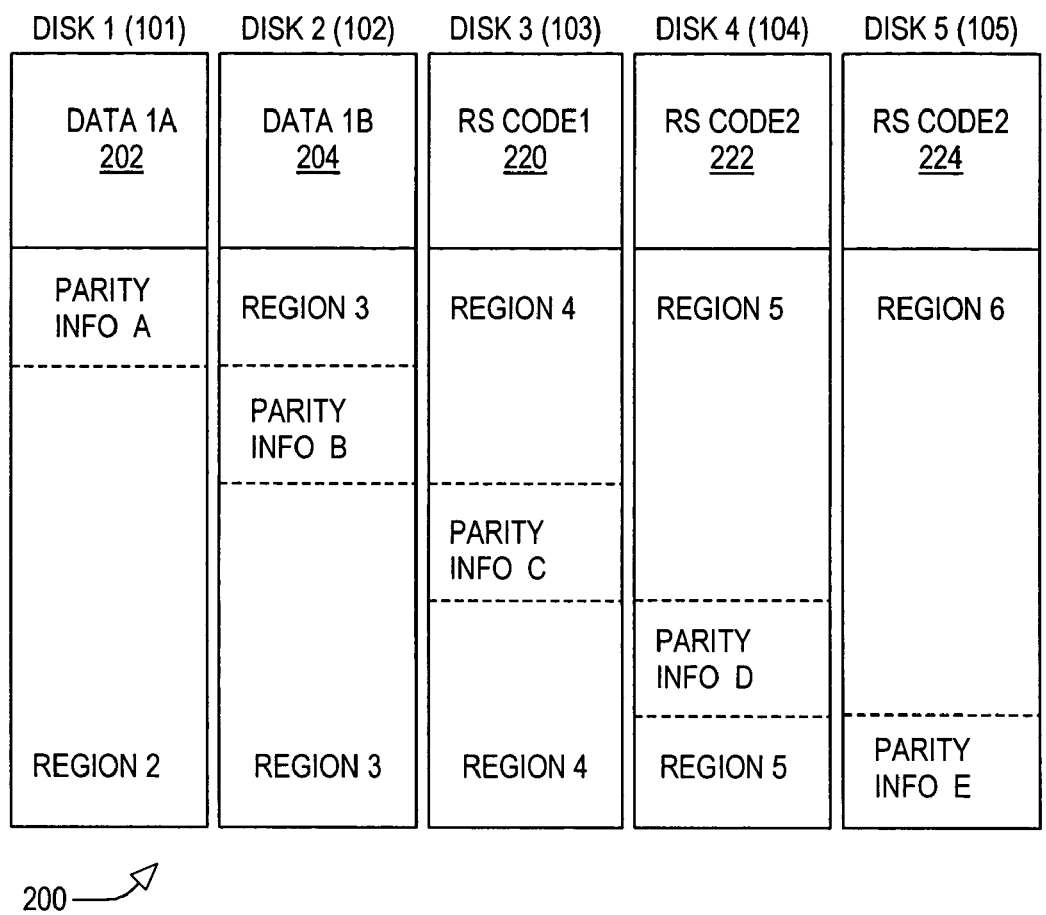
FIG. 12 and FIG. 13 depict a data storage implementation that uses Reed-Solomon code error correction.

Referring now to FIG. 12, a disk storage implementation 200 according to one embodiment of the present invention is depicted. In the depicted embodiment, the popular data is still represented as being contained within a first popular data block (data block 1A 202) and a second popular data block (data block 1B 204). In the depicted embodiment, data block 1A is stored on a portion of disk 101 while data block 1B 204 is stored on a portion of disk 102. The depicted storage implementation uses RS(5,2) and, accordingly, 3 blocks of RS codes are used. The first, second, and third RS code blocks (220, 222, and 224) are stored in corresponding portion of disks 103, 104, and 105 respectively.

Generating the RS codes 220–224, also referred to as encoding, and deriving the original data (decoding) from the generated codes is the subject of extensive literature. One desirable aspect of RS codes is that they are "systematic", meaning that they are appended to and leave the original data unaltered. The reader interested in the mathematics of RS code generation is referred to Reed and Solomon, *Polynomial Codes over Certain Finite Fields,* Journal of the Society of Industrial and Applied Mathematics (1960) and L. R. Welch and E. R. Berlekamp, *Error correction for algebraic block codes,* U.S. Pat. No. 4,633,470, issued Dec. 30, 1986.

With the RS code data storage implementation 200 depicted in FIG. 12, it is possible to specify that, as long as any three disks are active, data from data blocks 202 and 204 are accessible without requiring a disk transition. Data from any two disks are sufficient to perform a read access for data in blocks 202 or 204; a third disk must be active to perform write operations so that either data item and a new code block can be stored to protect the data from disk failures. While RS encoding and decoding implies more computational processing that simple parity or replication, RS encoding/decoding algorithms may be readily implemented in hardware or software. In either case, the time and power required to process the codes is substantially less than the time and energy required to spin up a disk. The RS code implementation depicted in FIG. 12 conserves disk spin up events by removing restrictions on which disks can be active simultaneously. As long as any three of the disks are active, all of the popular data can be either accessed directly or derived using RS encoding/decoding algorithms.

Figure 13:
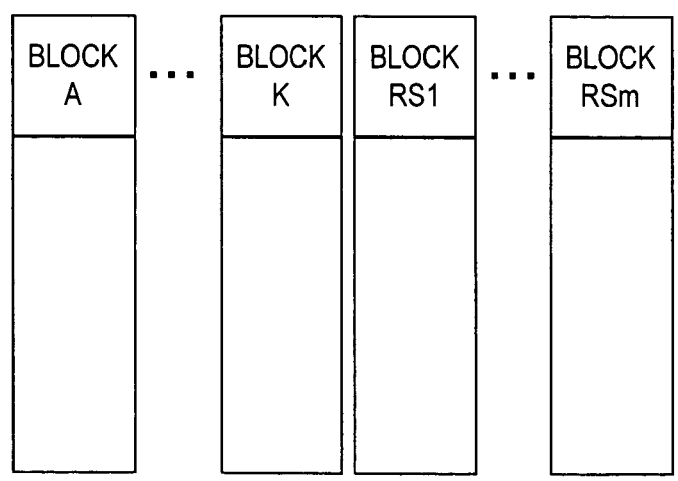

The embodiment of this data storage implementation can be generalized to accommodate different numbers of disks, different numbers of popular data blocks, and varying degrees of fault tolerance. Referring to FIG. 13, a generalized implementation of an RS-code based data storage system 201 is depicted according to one embodiment of the present invention. In the depicted embodiment, storage system 201 includes K disks, a portion of each of which is dedicated for storing popular data. These popular data blocks are identified in FIG. 13 as block A . . . block K. The remainder of each disk is used for other data (i.e., seldomly accessed data/frequently modified data/etc). These remaining portions of storage may implement traditional RAID techniques such as is shown in data regions 2–6 of FIG. 12. The system 201 further includes a total of M additional disks for storing RS codes based on the popular data in blocks A through K. In this generalized configuration, power conservation and high performance (i.e., low latency access to popular data) are balanced by maintaining K+1 of the K+M disks in active state. With K+1 active disks, fast read and write access to popular data is guaranteed regardless of on which disk the requested data resides and regardless of which disks are spinning. The number of disks M is governed by considerations of total disk capacity and fault tolerance requirements. If the expected number of disks that may fail concurrently does not exceed one, then only one RS code disk is necessary. On the other hand, if total data storage requirements dictate a large number of disks, the number of RS code disks can be increased thereby increasing the amount of fault tolerance without increasing the number of active disks required to guarantee fast access to all popular data. Importantly, regardless of the particular RS implementation, there are no restrictions on which disks can be active as long as at least K+1 are active. (Of course, fewer than K+1 disks may be active if one is willing to accept the eventual spin-up cost incurred when a particular piece of data cannot be determined from the data in the currently active disks).

It will be apparent to those skilled in the art having the benefit of this disclosure that the present invention contemplates an energy conserving data storage system that minimizes performance penalties and leverages excess storage capacity. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data storage system, including
   a set of disks including at least first, second and third disks, each having a first portion for popular data or error correction information associated with the popular data and each having a remaining portion used for remaining data;
   a disk controller connected to the set of disks and configured to maintain a first popular data block in the first portion of the first disk and a second popular data block in the first portion of the second disk, wherein the disk controller includes:
      means for maintaining at least two of the disks in the set of disks in an active state, wherein the at least two active disks are selected to insure that any data in the popular data blocks can be determined from data stored in the active disks; and
      means for biasing to an inactive state at least one of the disks in the set of disks that is not selected as an active disk, such that power consumption is reduced.

2. The system of claim 1, wherein the error correction information is encoded using Reed-Solomon encoding based on the data in the first and second popular data blocks.

3. The system of claim 2, wherein the disk controller is further configured to maintain additional popular data blocks, each popular data block being maintained in the first portion of a corresponding disk, and wherein the means for maintaining at least two disks in an active state comprises means for maintaining active disks equaling the number of popular data blocks.

4. The system of claim 2, wherein the set of disks includes at least one disk for storing the Reed-Solomon encoded error correction information.

5. The system of claim 2, wherein the means for maintaining at least two active disks further comprises means for maintaining at least three active disks if the disks can be written to.

6. A data storage system, including
   a set of disks including at least first, second and third disks, each having a first portion for popular data or error correction information associated with the popular data and each having a remaining portion used for remaining data, wherein the error correction information comprises parity information derived from an exclusive OR product of data in the first portions of the other disks;
   a disk controller connected to the set of disks and configured to maintain a first popular data block in the first portion of the first disk and a second popular data block in the first portion of the second disk, wherein the disk controller includes:
      means for maintaining at least two of the disks in the set of disks in an active state, wherein the at least two active disks are selected to insure that any data in the popular data blocks can be determined from data stored in the active disks.

7. The system of claim 6, wherein the disk controller is further configured to maintain additional popular data blocks, each popular data block being maintained in the first portion of a corresponding disk, and wherein the means for maintaining at least two disks in an active state comprises means for maintaining active disks equaling the number of popular data blocks.

8. The system of claim 7, wherein the disk controller is further configured to replicate each popular data block in the first portion of at least one other disk.

9. The system of claim 8, wherein the means for maintaining the active disks includes means for insuring that one of the active disks contains the parity information and that all popular data blocks can be accessed or algorithmically computed from data in the first portions of the active disks.

10. A method of storing data in an array of N disks, where N is an integer greater than an integer K, said method comprising:
    maintaining at least a first block of popular data in a first address region of a first subset of the disks in the disk array and a second block of popular data in a first address region of a second subset of the disks, wherein said maintaining includes maintaining K popular data blocks in the first address regions of K disks;
    maintaining Reed-Solomon error correction code in a first address region of a third subset of the disks; and
    maintaining the remaining address region of the disks using a RAID 4 or RAID 5 storage organization.

11. The method of claim 10, and further comprising maintaining at least K of the set of disks in an active state.

12. The method of claim 11, wherein maintaining at least K of the set of disks in an active state further comprises:
    maintaining at least K+1 of the set of disks in an active state; and
    permitting write access to the K popular data blocks.

13. The method of claim 12, and further comprising biasing the remaining N−(K+1) disks to an inactive state.

14. A computer program product for storing data in an array of N disks, where N is an integer greater than an integer K, said computer program product comprising a computer readable storage medium having stored therein:
    computer code means for maintaining at least a first block of popular data in a first address region of a first subset of the disks in the disk array and a second block of popular data in a first address region of a second subset of disks, wherein said computer code means for maintaining includes computer code means for maintaining K popular data blocks in the first address regions of K disks;
    computer code means for maintaining Reed-Solomon error correction code in a first address region of a third subset of the disks; and
    computer code means for maintaining the remaining address region of the disks using RAID 4 or RAID 5.

15. The computer program product of claim 14, and further comprising code means for maintaining at least K of the set of disks in an active state.

16. The computer program product of claim 15, wherein: said code means for maintaining at least K of the set of disks in an active state further comprises code means for maintaining at least K+1 of the set of disks in an active state; and
    said computer program product further comprises code means for permitting write access to the K popular data blocks.

17. The computer program product of claim 16, and further comprising code means for biasing the at least N−(K+1) disks in an inactive state.

* * * * *